(12) United States Patent
Astakhov et al.

(10) Patent No.: US 7,195,428 B2
(45) Date of Patent: Mar. 27, 2007

(54) GUNDRILL

(75) Inventors: Viktor P. Astakhov, Rochester Hills, MI (US); Yefim Val, Troy, MI (US); Gregory Link, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 10/655,983

(22) Filed: Sep. 5, 2003

(65) Prior Publication Data
US 2004/0091328 A1 May 13, 2004

Related U.S. Application Data

(60) Provisional application No. 60/425,421, filed on Nov. 11, 2002.

(51) Int. Cl.
*B23B 51/02* (2006.01)
*B23B 51/06* (2006.01)

(52) U.S. Cl. .................... 408/59; 408/229; 408/230

(58) Field of Classification Search .............. 408/57, 408/59, 199, 227, 229, 230, 705; B23B 51/02, B23B 51/06
See application file for complete search history.

(56) References Cited

U.S. PATENT DOCUMENTS

| | | | |
|---|---|---|---|
| 1,513,350 A | 10/1924 | Stolle | |
| 2,325,535 A | 7/1943 | Nordberg | |
| 3,054,308 A | 9/1962 | Larry | |
| 3,260,139 A | 7/1966 | Sanborn | |
| 4,092,083 A | 5/1978 | Larry | |
| 4,137,002 A | 1/1979 | Barker et al. | |
| 4,395,169 A | 7/1983 | Kashiwagi et al. | |
| 5,443,585 A | 8/1995 | Kawase et al. | |
| 5,486,075 A * | 1/1996 | Nakamura et al. | .......... 408/230 |

(Continued)

FOREIGN PATENT DOCUMENTS

DE    1 552 463    7/1970

(Continued)

OTHER PUBLICATIONS

European Search Report—mailed Apr. 29, 2004 for EP 03 10 4139, foreign equivalent of present application.

*Primary Examiner*—Monica Carter
*Assistant Examiner*—Eric A. Gates
(74) *Attorney, Agent, or Firm*—Raymond L. Coppiellie; Brooks Kushman P.C.

(57) ABSTRACT

A method of forming deep holes and a gundrill therefore is disclosed. The gundrill has an elongate tubular shank and a cutting tip, each provided with a tubular central region supplying pressurized drilling fluid and a non-circular fluid cross-section defining a drilling fluid return path in conjunction with the hole being formed. The cutting tip flute defines a primary rake surface terminating in an offset point, and a secondary flank surface for forming an outlet with the hole being drilled, sized to maintain fluid pressure in the bottom end space to cool the cutting surfaces and to effectively remove chips as they are formed. A localized relief passage, sized relative to the outlet passage to cause a significant amount of drilling fluid to flow therethrough, is formed behind a peripheral rake edge of the primary rake surface for drilling fluid to exit the end space and cool the tip.

19 Claims, 8 Drawing Sheets

U.S. PATENT DOCUMENTS

| | | | |
|---|---|---|---|
| 5,544,985 A * | 8/1996 | Lane | 408/56 |
| 5,569,035 A * | 10/1996 | Balfour et al. | 433/165 |
| 5,947,660 A * | 9/1999 | Karlsson et al. | 408/230 |
| 6,481,938 B2 * | 11/2002 | Widin | 408/226 |
| 6,626,614 B2 * | 9/2003 | Nakamura | 408/59 |
| 6,641,395 B2 * | 11/2003 | Kumar et al. | 433/165 |
| 6,676,342 B2 * | 1/2004 | Mast et al. | 408/144 |
| 6,698,981 B1 * | 3/2004 | Beno et al. | 408/59 |
| 7,114,892 B2 * | 10/2006 | Hansson | 408/226 |
| 7,134,816 B2 * | 11/2006 | Brink | 408/226 |
| 2003/0175085 A1 * | 9/2003 | Prokop | 408/59 |
| 2004/0091327 A1 | 5/2004 | Astakhov et al. | |
| 2006/0222470 A1 * | 10/2006 | Tchorny et al. | 408/224 |

FOREIGN PATENT DOCUMENTS

| | | |
|---|---|---|
| GB | 984664 | 3/1965 |
| JP | S52-136488 A | 11/1977 |
| JP | 57083313 A * | 5/1982 |
| JP | H01-140909 A | 6/1989 |
| JP | 2001-009613 A | 1/2001 |
| JP | 2002321111 A * | 11/2002 |
| SU | 732087 A | 5/1980 |
| SU | 975240 A | 11/1982 |
| SU | 1199480 A | 12/1985 |

* cited by examiner

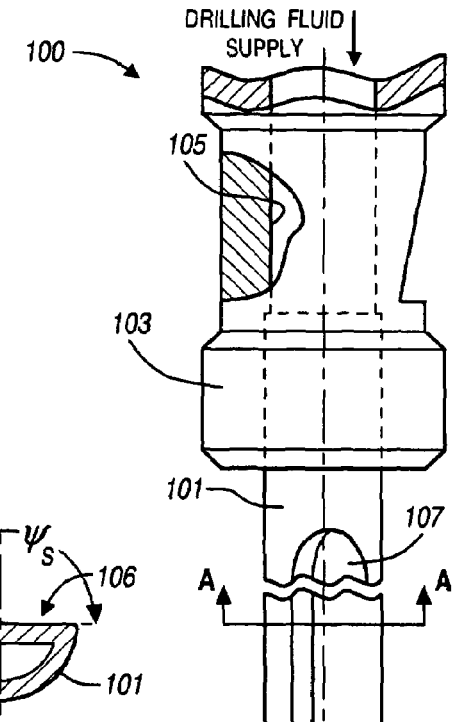
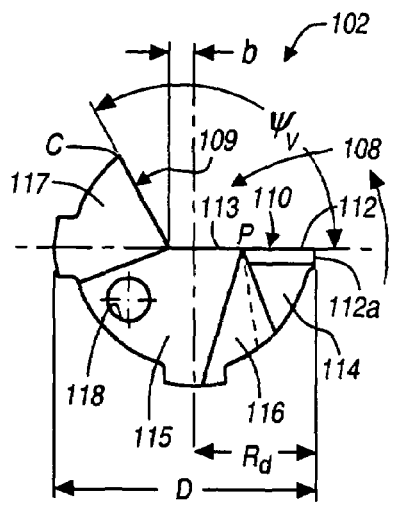
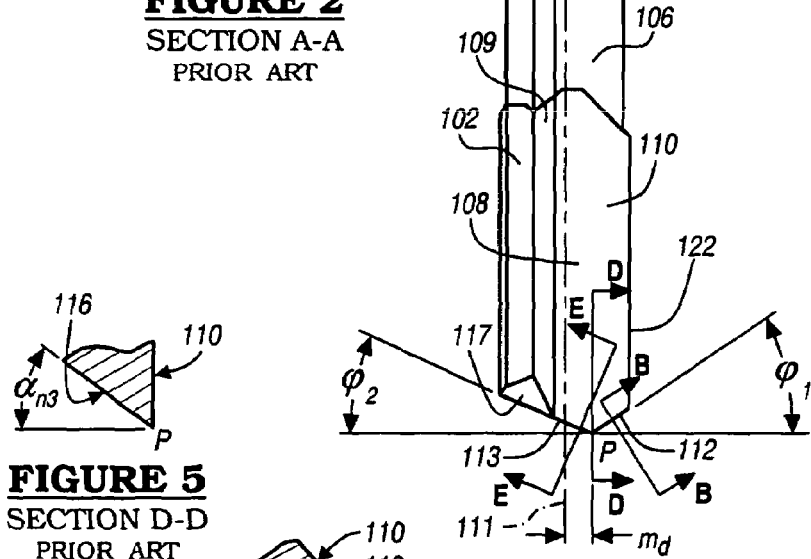
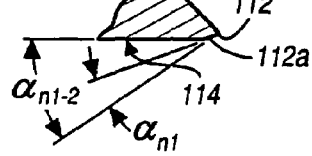
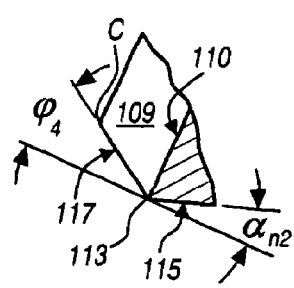
FIGURE 1
PRIOR ART
FIGURE 2
SECTION A-A
PRIOR ART
FIGURE 3
SECTION B-B
PRIOR ART
FIGURE 4
SECTION E-E
PRIOR ART
FIGURE 5
SECTION D-D
PRIOR ART
FIGURE 6
PRIOR ART

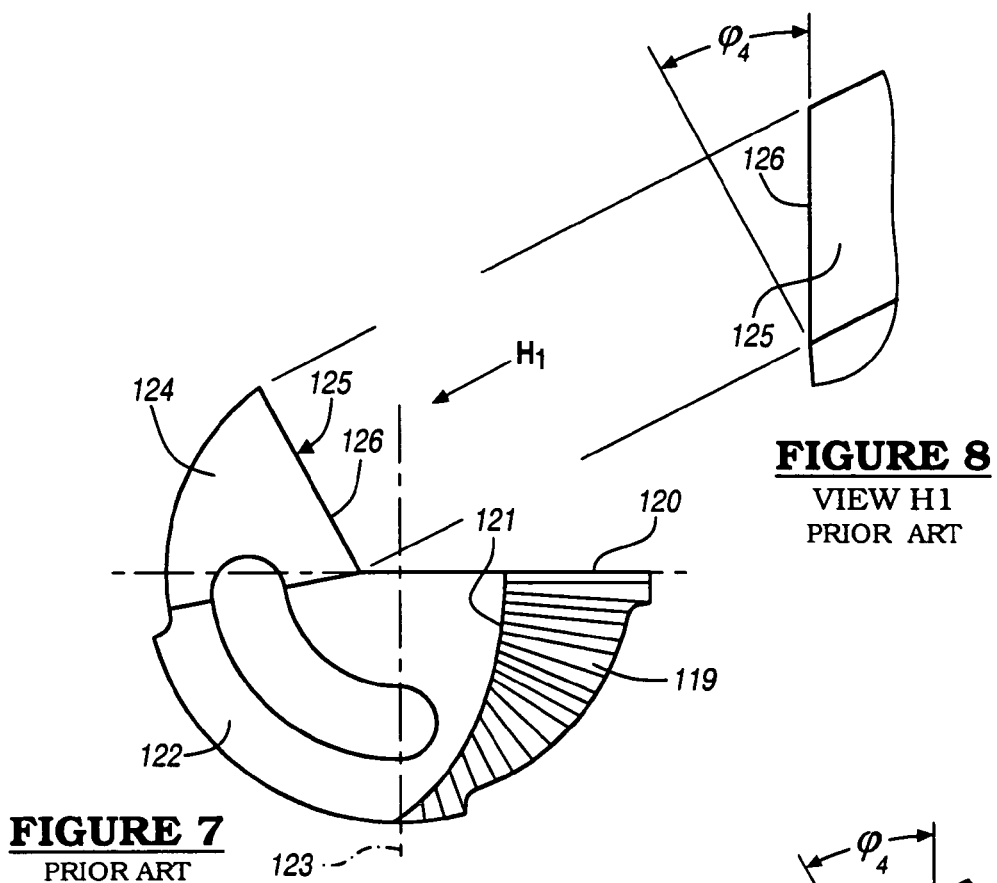
FIGURE 7
PRIOR ART
FIGURE 8
VIEW H1
PRIOR ART
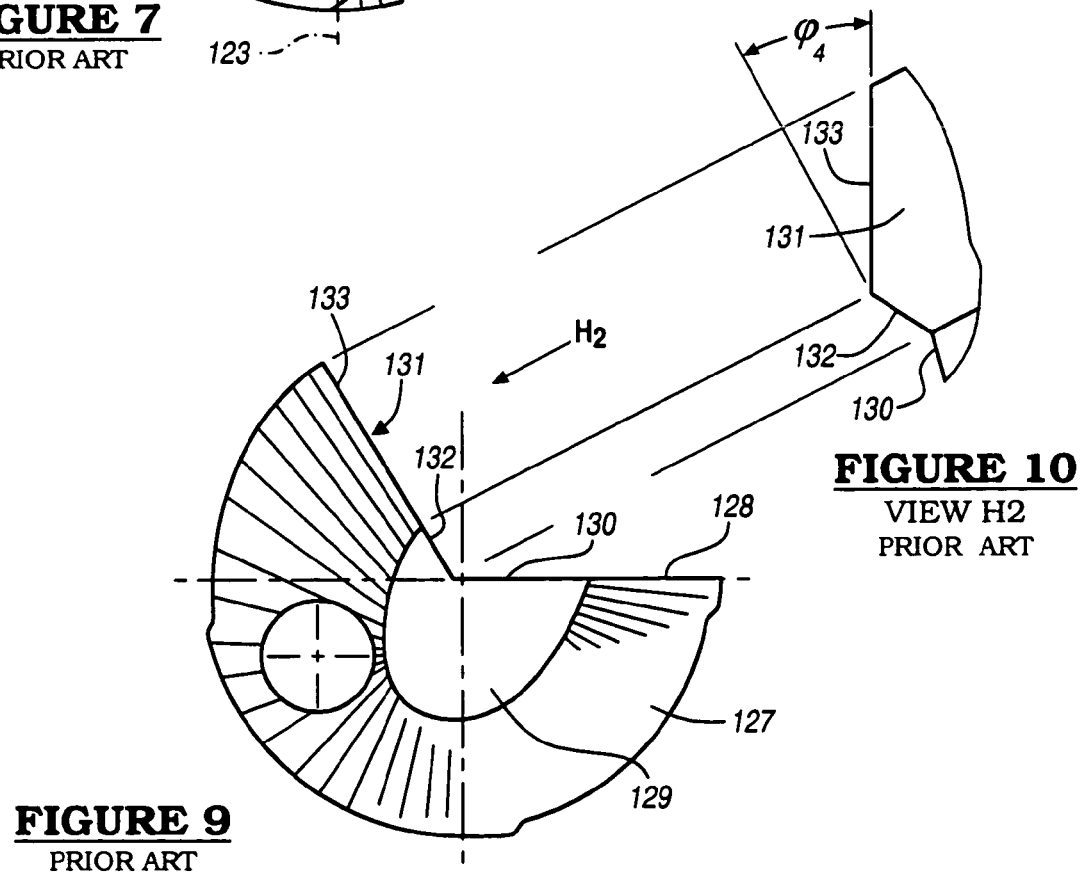
FIGURE 9
PRIOR ART
FIGURE 10
VIEW H2
PRIOR ART

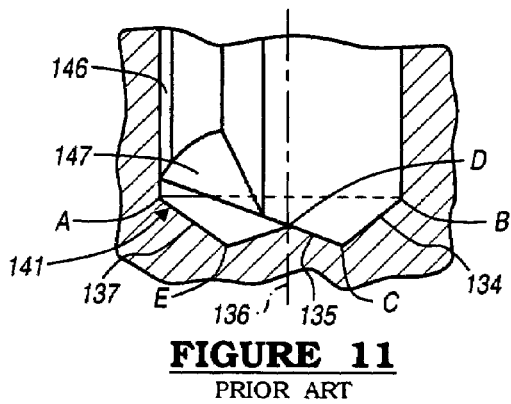
FIGURE 11
PRIOR ART
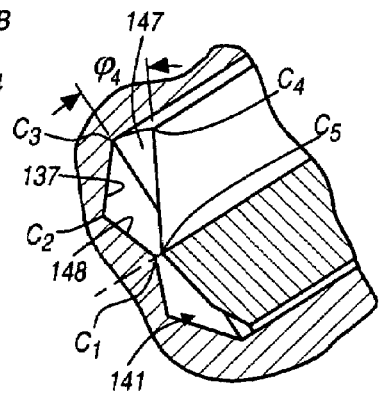
FIGURE 13
SECTION Q2-Q2
PRIOR ART
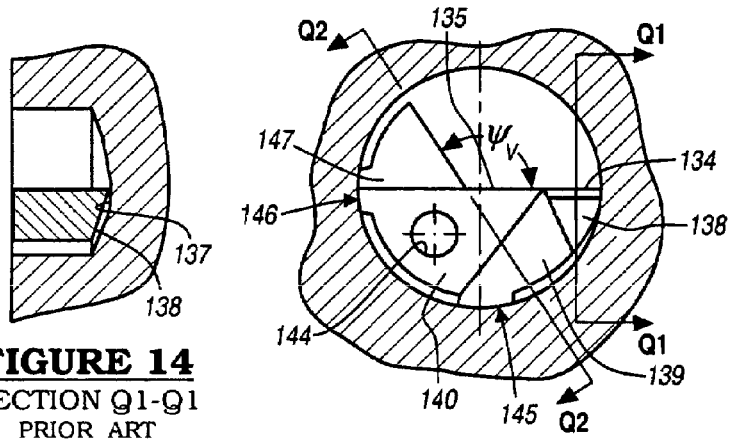
FIGURE 14
SECTION Q1-Q1
PRIOR ART
FIGURE 12
PRIOR ART
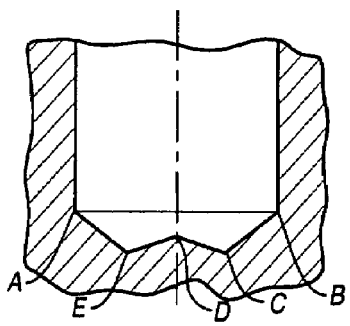
FIGURE 11A
TYPICAL
PRIOR ART
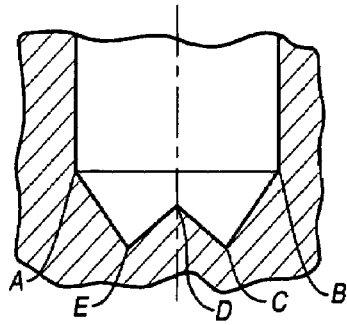
FIGURE 11B
SOFT
PRIOR ART
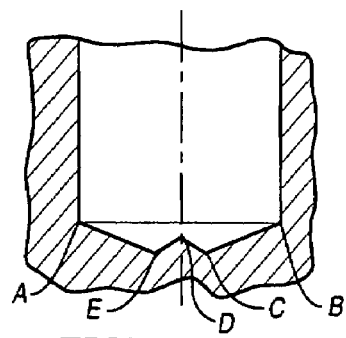
FIGURE 11C
BRITTLE
PRIOR ART

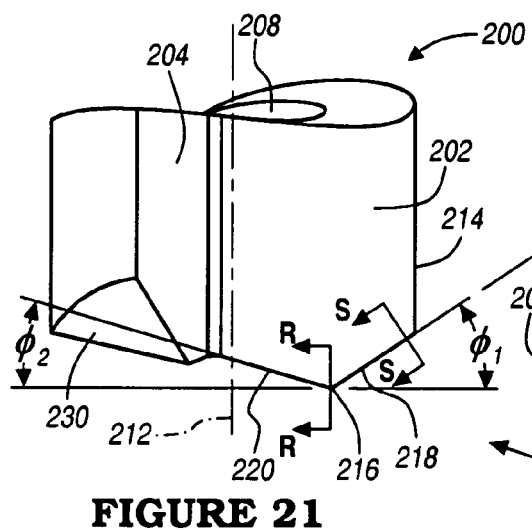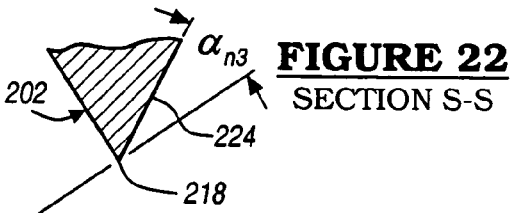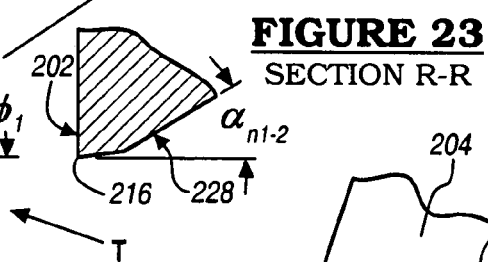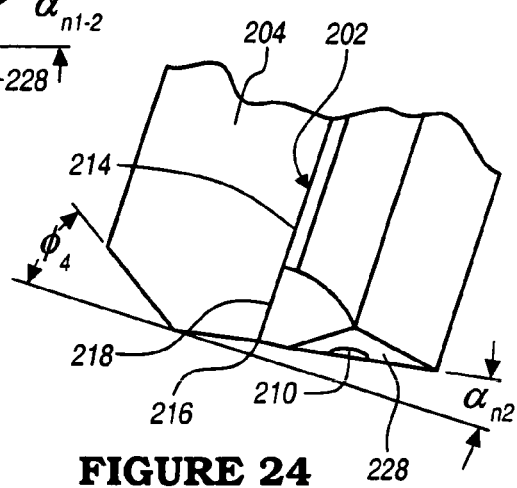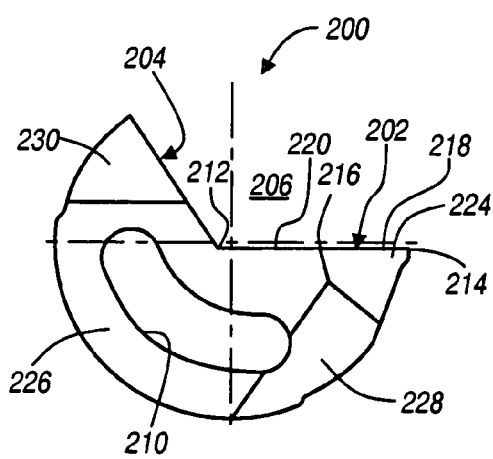

SECTION U-U

VIEW V1

VIEW V2

SECTION X-X

VIEW W

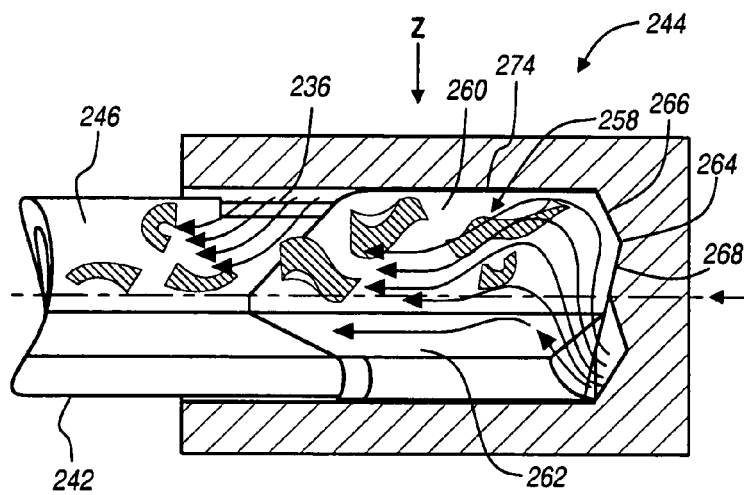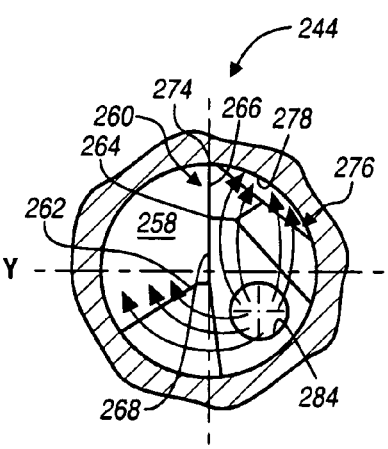
FIGURE 34
FIGURE 35
VIEW Y
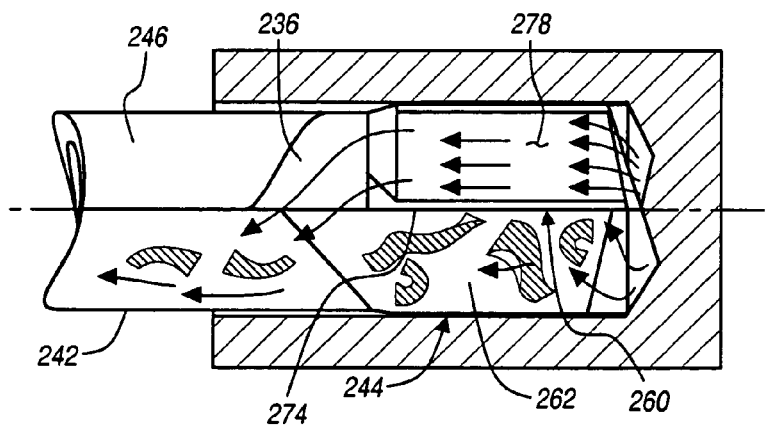
FIGURE 36
VIEW Z

GUNDRILL

CROSS-REFERENCE TO RELATED APPLICATIONS

This application claims the benefit of U.S. provisional application Ser. No. 60/425,421, filed Nov. 11, 2002.

BACKGROUND OF THE INVENTION

1. Field of the Invention

This invention relates to gundrills, i.e., self-piloting drills provided with an internal drilling fluid passage for drilling holes that are quite deep relative to their diameter.

2. Background Art

Gundrills are commonly used to drill deep holes into metal components, wherein the hole depth greatly exceeds the hole diameter. Gundrills are widely used in a number of industry applications, such as engine manufacturing, heat exchangers, machine tools, or the like. These applications commonly require deep holes or bores, formed in metal workpieces, by a machining operation. Gundrills are used in applications characterized by holes that are sufficiently deep such that a normal twist drill having two or more cutting edges extending generally outward from a central axis would not work effectively. When drilling relatively deep holes, twist drills tend to wander away or diverge from a central drilling axis, and the flutes tend to clog with metal chips.

In comparison, a gundrill typically has a single cutting edge eccentrically oriented off of the drill centerline. Typically, it is necessary to use a starting bushing or pilot hole to prevent the drill from orbiting off center as the hole is started. Once the hole is initially formed, the drill tip axially guides itself. Gundrills are typically provided with an elongate axial drilling fluid passageway which extends through the drill shank and drill tip. Drilling fluid or coolant is pumped through the drilling fluid passageway and as chips are formed, they are removed from the hole in a stream of drilling fluid in another passageway formed between the hole internal diameter and an elongate groove or flute formed in the gundrill.

Over the years, a number of tip geometries have been utilized in an effort to optimize a drill's performance. In spite of the years of development efforts, there remains a need for an improved gundrill design which can drill holes in a variety of metal workpieces from relatively brittle cast iron to soft ductile aluminum. The gundrill ideally, should be capable of efficiently forming small chips at the cutting tip, which can be effectively extracted from the hole by the cutting fluid. Manufacturers are always trying to increase drill feed rates while minimizing tip wear. It is desirable to maximize the number of holes that can be formed in an hour and to maximize the number of holes that can be formed before the drill tip needs to be redressed. It is further desirable from a maintenance standpoint to have a single tip design which has a minimum number of planar facets which can be redressed by a standard grinding wheel in a gundrill sharpening station.

SUMMARY OF THE INVENTION

An object of the invention is to provide a gundrill defined as an elongate tubular member formed of a shank and a tip. The shank and tip each have a fluted cross-section and an internal drilling fluid passage. The shank is driven at a fixed end and has a distal end to which a cutting tip is affixed. The fluid passageway extends through the tubular shank and the cutting tip end terminates in an orifice at the tip end. A tip flute extends axially from the tip end and is aligned with the flute formed in the tubular shank. The flute forms a passage for drilling fluid to exit and carry away chips as they form.

An aspect of the present invention is provided, wherein the flute in the cutting tip defines a secondary flank surface and a generally radially extending primary rake surface. The primary rake surface has a peripheral rake edge generally parallel to the central axis of the drill. The primary rake surface defines a generally radially extending cutting edge at the tip end forming a radially offset point. Preferably, the region of the cutting tip that is behind the primary rake surface and the secondary flank surface, is relieved by applying flank or relief planes. The tip end is formed of a series of adjacent relief surfaces, which are preferably planar facets. A four facet design illustrated has outer relief and inner relief, a secondary relief (intermediate the outer/inner relief) and a dub-off relief behind the corner formed by the secondary flank surface and the outer periphery of the tip. These relief surfaces collectively define a tip end surface through which the drilling fluid orifice passes. The tip end cooperates with the bottom of the hole being formed and defines therebetween a bottom clearance space into which drilling fluid from the orifice initially flows before the bulk of the fluid exits the bottom space through an outlet passage defined between the lowermost edge of the secondary flank surface and the hole bottom.

The present invention controls the relative size of the outlet section in order to optimize drilling fluid flow for chip removal purposes, and for cooling and lubricating of the cutting surfaces and wear paths. The cross-sectional area of the outlet passage can be expressed in the form of a ratio with respect to the bottom space cross-sectional area. The outlet passage area should be less than 100 percent, preferably less than sixty percent and most preferably less than 25 percent of the bottom space cross-sectional area.

In a further aspect of the invention, the cutting tip primary rake surface has a peripheral rake edge, which is generally parallel to the central axis. The region immediately behind the peripheral rake edge deviates inwardly from this cylindrical hole being formed to provide an enlarged circumferentially localized relief passage providing an axial flow path between the outer periphery of the cutting tip and the cylindrical bore of the hole being formed. The relief passage communicates with the bottom space which causes pressurized cutting fluid to flow through the relief passage, cooling and lubricating the peripheral rake edge. Preferably the relief passage is formed by machining a relief flat behind the peripheral rake edge inclined inboard twenty to thirty degrees from a plane which is tangent to the hole being drilled and perpendicular to the primary rake surface. Preferably, over ten percent of the drilling fluid exits the bottom space through the side relief passage.

BRIEF DESCRIPTION OF THE DRAWINGS

FIG. 1 is a side view of a conventional prior art gundrill with a solid carbide tip;

FIG. 2 is a cross-sectional view of the gundrill of FIG. 1 taken along section line A—A;

FIG. 3 is a fragmentary cross-sectional view of the gundrill of FIG. 1 taken along section line B—B;

FIG. 4 is a fragmentary cross-sectional view of the gundrill of FIG. 1 taken along section line E—E;

FIG. 5 is a fragmentary cross-sectional view of the gundrill of FIG. 1 taken along section line D—D;

FIG. 6 is an axial end view of the gundrill of FIG. 1;

FIG. 7 is an axial end view of another conventional prior art drill bit having a helical convex flank surface, or relief surface, of relatively great generating diameter;

FIG. 8 is a partial side view taken in the direction of arrow $H_1$ in FIG. 7;

FIG. 9 is an axial end view of a conventional prior art drill bit having a helical convex flank surface, or relief surface, of relatively small generating diameter;

FIG. 10 is a partial side view taken in the direction of arrow $H_2$ of FIG. 9;

FIG. 11 is a cross-sectional view of a hole being drilled by the drill bit shown in FIG. 1;

FIGS. 11a–11c illustrate three alternative bottom space cross-sections for gundrills designed to cut respectively typical, soft and brittle materials;

FIG. 12 is an axial end view of the drill bit of FIG. 11;

FIG. 13 is a cross-sectional view of the drill bit taken along view line Q2—Q2 of FIG. 12;

FIG. 14 is a cross-sectional view of the drill bit taken along view line Q1—Q1 of FIG. 12;

FIG. 21 illustrates an enlarged side elevational view of a gundrill tip of the present invention;

FIG. 22 is a cross-sectional view taken along section line S—S of FIG. 21;

FIG. 23 is a cross-sectional view taken along section line R—R in FIG. 21;

FIG. 24 is a side elevational view taken in the direction of arrow T in FIG. 21;

FIG. 25 is an axial end view of the gundrill embodiment in FIG. 21;

FIG. 34 is a side illustration of a gundrill of the present invention drilling a workpiece illustrating drilling fluid indicia of flow;

FIG. 35 is an axial end view taken in the direction of arrow Y in FIG. 34; and

FIG. 36 is a top view taken in the direction of arrow Z in FIG. 34.

DETAILED DESCRIPTION OF THE PREFERRED EMBODIMENT(S)

Figure 15:
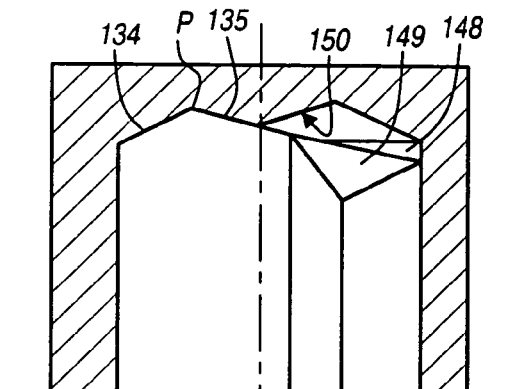
FIG. 15 is a partial side view of a prior art gundrill with a slash tip design.

In order to understand the subtle, but dramatic differences between the present invention and the prior art, it is necessary to first understand the gundrills of the prior art, particularly how they interact with the hole being formed and the drilling fluid being supplied to the cutting tip. After a detailed analysis of chip formation and the drilling fluid flow behavior in prior art gundrills, the benefits and advantages of the present invention can be fully understood and appreciated.

Gundrilling is a method of drilling holes where a self-piloting tool with an internal drilling fluid supply and an external chip removal path is used. A commonly used gundrill 100 of the prior art is shown in FIGS. 1 through 6. Gundrill 100 consists of a drill body having a shank 101 and a tip 102. The tip 102 is mounted on the free end of the shank 101, and is made up of a hard wear-resistant material such as a metallic carbide. The other end of the shank 101 is provided with an enlarged driver 103 having a machine-specific design. The driver 103 mounts to a tool holder on a rotary spindle of a drilling machine and is supplied with pressurized drilling fluid.

The shank 101 is tubular having an elongated internal passage 104 (FIG. 2) extending within its entire length and connecting to the drilling fluid supply passage 105 in the tool holder. The shank 101 has a generally V-shaped flute 106 on its exterior surface. The flute 106 terminates in an inclined, ramp or crease 107 formed adjacent to the driver 103. The shank wall thickness depends on a particular tube producer. Commonly, it is in the range of ten to twelve percent of the outside diameter of the shank. The angle of the V-flute profile of the shank, $\Psi_s$, is usually between 100 degrees and 130 degrees. The shank length is determined from the tool layout. It depends mainly on the depth of the drilled hole, and the axial length of the starting bushing, its holder and the chip box, if employed.

The shank 101 is smaller in diameter than the tip 102, in order to prevent the shank 101 from contacting the walls of the hole being drilled. Flute 108 in tip 102, which is similar in shape to flute 106 in shank 101, extends along the full length of the tip 102. The flutes 106 and 108 are longitudinally aligned. The above description is illustrated in FIG. 1 as a straight flute construction, which is preferred for ease in manufacturing the present invention, but other flute constructions such as that of a helical type are also possible.

Tip flute 108 is bounded by sidewalls 109 and 110, which are hereafter referred to as the secondary flank surface and the primary rake surface, respectively (FIG. 6). The secondary flank surface 109 is referred to as a flank surface, rather than rake surface because it does not perform a cutting operation upon the workpiece. The depth of this flute 108 is such that primary rake surface 110 extends past the axis 111 (distance b) of the tip portion, which is also the axis of the drill body. The angle between the secondary flank surface and the primary rake surface is known as the profile angle of the tip $\psi_v$ which is usually equal or close to the V-flute profile of the shank, $\psi_s$. The profile angle is typically between 100 degrees and 130 degrees.

The terminal end of the tip portion is formed with outer 112 and inner 113 cutting edges, having approach cutting edge angles $\phi_1$ and $\phi_2$ respectively. These cutting edges meet at the drill point P. The location of P (defined by distance $m_d$ in FIG. 1) can be varied for optimum performance depending on the work material and the finished hole specifications. One common prior art example includes a point that is ground such that the outer angle $\phi_1$ is measured as thirty degrees, from a plane normal to the axis 111 and intersecting point P; and the inner angle $\phi_2$ is measured as twenty degrees. The geometry of the terminal end largely determines the shape of the chips, the effectiveness of the drilling fluid, the lubrication of the tool, and removal of the chips. The process of chip formation is also governed by other cutting parameters such as the cutting speed, feed rate, work material, and the like.

A primary relief 112a is commonly provided on the flank of the outer cutting edge 112 when steels and alloyed work materials are to be drilled. This relief is illustrated in FIG. 3 with a normal clearance, or flank, angle, $\alpha_{n1}$, which is typically characterized between eight and twelve degrees. In drilling of easily machinable materials, the outer cutting edge 112 is provided with the single relief, or flank surface 112a. A secondary flank or outer flank plane 114 is applied to the outer cutting edge 112 to provide space for the drilling fluid to reach the cutting edge 112 (FIG. 3). The secondary flank 114 is illustrated as clearance angle $\alpha_{n1\text{-}2}$, which is approximately twenty degrees. The inner cutting edge 113 includes a flank or inner flank plane 115, with the normal clearance, or flank, angle equal to $\alpha_{n2}$, which is normally between eight to twelve degrees (FIG. 4).

FIGS. 4 through 6 depict a gundrill having planar flank, or relief, surfaces. The outer flank plane 114 lies adjacent to the outer cutting edge 112. The inner flank plane 115 lies adjacent to the inner cutting edge 113 and intersects the outer flank plane 114 at point P. An auxiliary flank plane 116 is applied between the outer and inner flank planes 114 and 115, to prevent possible interference of the rib (shown in FIG. 6 by a phantom line) which forms as the intersection line after outer and inner flank planes 114 and 115 are ground. The auxiliary flank plane 116 is normally ground with a flank angle $\alpha_{n3}$ within a range of twenty-five to thirty-five degrees (FIG. 5). A shoulder dub-off plane 117 is located as shown in FIGS. 1, 4, and 6. Normally, the shoulder dub-off angle, shown in FIGS. 1, is equal to thirty degrees to assure free penetration of point C (FIGS. 4 and 6) in drilling. Normally, the fluid passage 104 terminates at a tip orifice 118, that is located on the inner flank plane 115 (FIG. 6). Gundrill manufacturers have adopted various shapes for this orifice; one or two circular holes or a single crescent, comma-like or kidney-shaped hole.

Another common prior art shape of the flank, or relief, surface is a helical surface rather than a planar surface. The helical flank surface is normally applied to the flank of the outer cutting edge. Different manufacturers have different standards on the lead and generating diameter of the helical flank surface, depending upon drill diameter. Modern designs use great lead and generating diameters so that the flank surface of the outer cutting edge does not affect the shape of the flank plane of the inner cutting edge, or the shoulder dub-off.

For example, with reference to FIG. 7, a helical convex surface 119 is applied to an outer cutting edge 120. The lead and generating diameters of this surface are relatively large so the line, or rib of intersection 121 of outer 119 and inner 122 flank surfaces does not extend too far from the vertical axis 123. Therefore, shoulder dub-off 124 is not affected by the helical surface 119 such that a line of intersection 126 of a secondary flank surface 125 and the shoulder dub-off 124 is a straight line having a shoulder dub-off angle $\phi_4$ as illustrated in FIG. 8.

In older designs, for example U.S. Pat. No. 2,325,535, which are still in use, a relatively small lead and generating diameter of the helix surface is used so that this surface passes through the outer flank and shoulder dub-off as shown in FIG. 9. In this figure, a helical convex surface 127 is applied to an outer cutting edge 128. This helical convex surface 127 has a small lead and generating diameter so that it passes through a flank surface 129 of an inner cutting edge 130. As such, the line of intersection of the secondary flank surface 131 and the flanks 129 and 127 is a jagged line consisting of two lines 132 and 133 (FIG. 10). The shoulder dub-off angle in this prior art illustration is shown in FIG. 10.

FIGS. 11 through 14 depict a gundrill while drilling. The rotation of an outer cutting edge 134 and an inner cutting edge 135 about a longitudinal central axis 136 results in the formation of a sculpture surface 137 upon the bottom region of the hole being drilled. The shape of this surface is uniquely determined by the shape and location of the cutting edges and location of the drill point P (parameter $m_d$ in FIG. 1). Therefore, the space occupied by this surface, which is referred to as the bottom space, is uniquely determined by these design parameters. Important for our further considerations is the axial cross-sectional area of the bottom space which is the area limited by polygon ABCDE shown in FIG. 11. For example, for the common design of gundrill design shown in FIG. 1 where the outer and the inner cutting edges are straight, the axial cross-sectional area of the bottom surface is calculated by:

$$A_{BS} = [(R_d - m_d)^2 \tan \phi_1 + m_d^2 \tan \phi_2] + 2m_d[(R_d - m_d)\tan \phi_1 + m_d \tan \phi_2] \qquad (1)$$

wherein $R_d$ is the drill radius (FIG. 6); $m_d$ is the location distance of the drill point P (FIG. 1); $\phi_1$ is the approach cutting edge angle of the outer cutting edge; and $\phi_2$ is the approach cutting edge angle of the inner cutting edge (FIG. 1).

Between the sculpture surface 137 of the hole being drilled, and opposing outer flank 138, auxiliary flank 139, and inner flank 140, of the drill, a limited clearance space 141 provided. The complicated topology of the bottom clearance space 141 can be appreciated in different cross-sections. One such cross-section is shown in FIG. 14, wherein a narrow amount clearance is provided between the outer flank 138 and the sculpture surface 137.

The drilling fluid is supplied into the bottom clearance 141 under pressure through a drilling fluid passage tip orifice 144. The drilling fluid pressure in the bottom clearance space 141 has a major influence on the cooling and lubrication condition on the inner flank 140, outer flank 138 and the respective cutting edges as well as on a pair supporting pads, 145, 146. The supporting pads 145 and 146 extend longitudinally along the gundrill for contacting the inner diameter of the hole and piloting the drill therein.

As an increased drilling fluid pressure is applied, the life of the drill is extended. High drilling fluid pressure provided in the bottom clearance space 141 provides better penetration of the drilling fluid to the extremely narrow passages (see SECTION Q1—Q1 in FIG. 14), thus enhancing the lubricating and cooling of the flank contact areas. This is particularly important for drilling fluid penetration in the regions adjacent to the drill periphery point B (FIG. 11) due to the highest radial speed and the removal of the greatest material volume of the workpiece. Unfortunately, the prior art does not adequately supply drilling fluid to this area; and, therefore, the tool wear in this region is much higher then in other regions.

It is a common belief that the drilling fluid pressure in the bottom clearance space 141 can be increased by increasing the inlet drilling fluid pressure, Pm. This belief is flawed. In prior art gundrill designs, an increase in the inlet pressure results in a corresponding increase in the drilling fluid flow rate. The increased fluid flow rate causes an increase in hydraulic resistance within the drilling fluid supply channels such that the drilling fluid pressure in the bottom clearance space 141 does not rise proportionally relative to the increased fluid flow rate.

Hydraulic resistance within the bottom clearance space 141 increases significantly as the fluid flow rate is increased in prior art gundrill designs. The velocity of the drilling fluid jet as it exits the tip orifice 144 (FIG. 12), increases significantly with the increased flow rate. Pressure losses occur when this fluid jet contacts the sculpture surface 137. These pressure losses are in effect, a loss of energy, thus causing a release of additional heat. Consequently, the increased drilling fluid pressure causes an increase in temperature, instead of decreasing it.

High drilling fluid velocities in the bottom clearance space 141, combined with low static drilling fluid pressure may lead to drilling fluid cavitation. A liquid boils at the temperature at which the surrounding pressure is equal to the vapor pressure. Thus, if a liquid flows into a region wherein the pressure is equal to its vapor pressure at that temperature, it boils forming vapor pockets, collectively referred to as fluid cavitation. Effects of cavitation are most noticeable in regions of high localized velocities. When even 'minor' cavitation occurs, the cooling ability of the drilling fluid reduces dramatically such that the tool life of the gundrill is further decreased.

The proper way to calculate the drilling fluid pressure $p_{BC}$ in the bottom clearance space 141 is as follows:

$$p_{BC} = \gamma_c (h_{DO} + h_v) \quad (2)$$

wherein $\gamma_c$ is the specific weight of the drilling fluid, in Newtons per meter cubed ($N/m^3$); $h_{DO}$ is the hydraulic resistance of the side drilling fluid passage formed by a shoulder dub-off surface 147 and the sculpture surface 137, in meters (m); and $h_v$ is the hydraulic resistance of the V-flute, in meters (m).

The hydraulic resistance of the V-flute, $h_v$ is very small compared to the hydraulic resistance $h_{DO}$; therefore, Equation (2) can be rewritten as:

$$p_{BC} = \gamma_c h_{DO} \quad (3)$$

As seen from this equation, under a given flow rate, the drilling fluid pressure in the bottom clearance space 141 is fully determined by the hydraulic resistance of a side drilling fluid passage, hereinafter referred as the side passage 148, which forms between the shoulder dub-off flank 147 and the sculpture surface 137 of the hole being drilled. The longitudinal cross-sectional area of the side passage 148 has a direct impact on the hydraulic resistance. This area is best depicted in cross-section Q2—Q2 (FIG. 13) as enclosed by polygon $C_1C_2C_3C_4C_5$.

Figure 17:
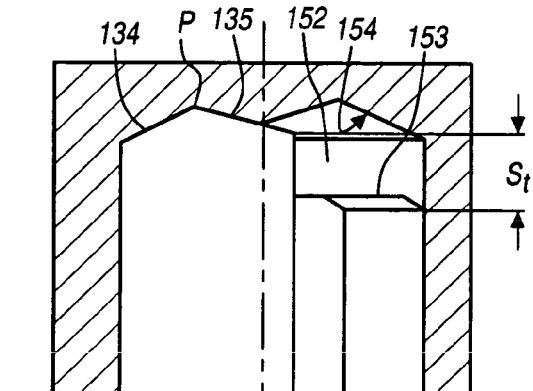
FIG. 17 is a partial side view of a prior art gundrill with a square step tip design.
Figure 18:
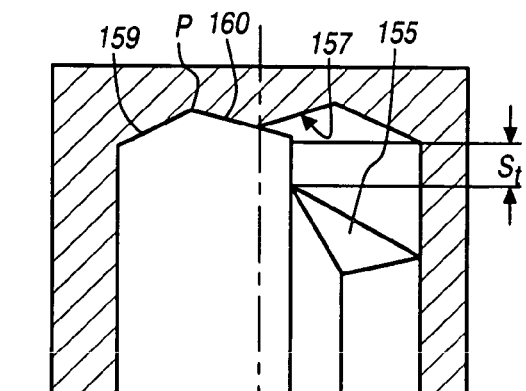
FIG. 18 is a partial side view of a prior art gundrill with a step slash tip design.

There are several widely recognized drill bits designs having various arrangements of the shoulder dub-off surfaces, commonly referred to as: a slash gundrill (FIG. 15), a slash with a notch gundrill (FIG. 16), a square stepped gundrill (FIG. 17) and a stepped-slash gundrill (FIG. 18). These designs differ significantly in the outlet cross-sectional area of the side passage 148.

The slash, or general purpose, gundrill (FIG. 15) is the most common design for European made drills, however some Japanese and North American manufacturers also utilize similar designs. The slash gundrill is the preferred design used today because it provides the maximum resistance of the side passage 148, in comparison to other existing designs, and consequently the maximum drilling fluid pressure in the bottom clearance space 141. This maximum drilling fluid pressure is caused by the relatively small cross-sectional area of the side passage 148 generated by the shoulder dub-off surface 149 being located sufficiently proximate to a sculpture surface 150 of the hole being drilled.

In the simplified common slash gundrill (FIG. 15), the outer and inner cutting edges 134 and 135 are straight. As such, this side passage area is calculated as:

$$A_{ot-sl} = 0.5\{A_{BS} + (\sqrt{R_d^2 - b^2 \sin^2 \psi_v} + b \cos \psi_v)^2 (\tan \phi_4 - 2 \tan \xi_L)\} \quad (4)$$

wherein $\phi_4$ is the shoulder dub-off angle, the measurement of distance b is illustrated in FIG. 6, and $$\xi_L = \arctan \frac{(R_d - m_d)\tan \varphi_1 - (m_d + b)\tan \varphi_2}{b \cos \psi_v + \sqrt{R_d^2 - b^2 \sin^2 \psi_v}} \quad (5)$$

Figure 16:
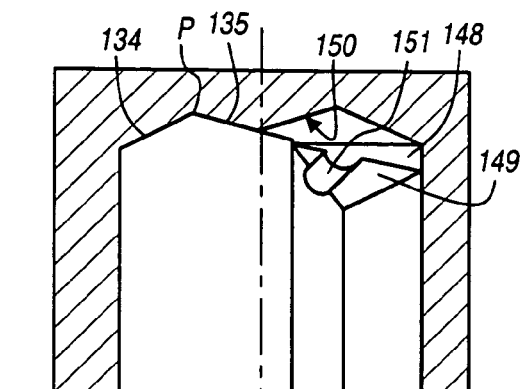
FIG. 16 is a partial side view of a prior art gundrill with a notch outlet tip design.

To increase the drilling fluid flow rate under a given pressure and thus to assure reliable chip removal, a notch 151 was added on the shoulder dub-off surface 149 as shown in FIG. 16. The drilling fluid pressure in the bottom clearance space 141, however, becomes smaller because the cross-sectional area of the side passage 148 increases.

In the notched gundrill depicted in FIG. 16, the outer and inner cutting edges 134 and 135 are straight, so the area of the side passage 148 is calculated as:

$$A_{ot-sl-n} = A_{ot-sl} + A_n \quad (6)$$

wherein $A_{ot-sl}$ is provided by equation 4; and $A_n$ is the cross-sectional area of the notch.

Initially, these prior art notched gundrill designs were introduced when gundrills were used on old or retrofitted machines, which were not capable to deliver high drilling fluid pressure.

The stepped square gundrill (FIG. 17) and the stepped slash gundrill (FIG. 18) designs provide a cross-sectional area of the outlet section of the side passage that is relatively large. In the stepped square design, a side passage 152 is formed without a shoulder dub-off surface. Instead, a drill flat flank face 153 is spaced from the distal end in the axial direction. A sculpture surface 154 and the flat flank face 153 form the step shown in FIG. 17. In the simplified stepped square gundrill, the outer and inner cutting edges 134 and 135 are straight, and consequently the cross-sectional area of the side passage 152 is calculated as:

$$A_{ot-sl} = R_d S_t + 0.5 A_{BS} \quad (7)$$

wherein $S_t$ is the length of the step (FIG. 17); and $A_{BS}$ is the axial cross-sectional area of the bottom space which is calculated using Equation 1.

In the stepped slash design shown in FIG. 18, a shoulder dub-off 155 is provided rather than the flat flank face 153 of the square stepped design. In a simplified example, the outer and inner cutting edges 134 and 135 are straight, such that the cross-sectional area of the side passage 152 is calculated as:

$$A_{ot-sl} = R_d S_t + 0.5(A_{BS} + R_d^2 \tan \phi_4) \quad (8)$$

wherein $\phi_4$ is the shoulder dub-off angle.

Although modern gundrilling machines are capable to deliver high drilling fluid pressure, the stepped-slash design is still in wide use today, particularly in the automotive industry.

The stepped square and the stepped-slash designs were introduced by a gundrill manufacturer that had limited knowledge of gundrilling. Although the intent behind these designs was to increase the flow rate through gundrills and thus improve chip removal, the application of these designs improved only apparent flow rate (fixed by a flow meter installed on the machine). With these designs, the drilling fluid static pressure in the bottom clearance space is very low. As a result, the drilling fluid does not have sufficient static pressure to flow in the narrow passages adjacent to the flank of the outer cutting edge 134 (see FIG. 14). Insufficient static pressure results in reduced tool life.

Another drawback of the prior art gundrills is not readily apparent to gundrill manufacturers and users. The chip removal process can be characterized as consisting of two stages, namely, chip collection, or pick up, and chip transportation along the V-flute chip removal groove. The latter requires sufficient drilling fluid flow rate and its reliability increases with this flow rate. The former is difficult to perceive and analyze and therefore, is commonly misunderstood during the design of gundrills.

Chip pick up is defined as the initial drilling fluid-chip interaction, resulting in collection of chips that are formed at the cutting edges, and picked up by the drilling fluid flow from the outlet cross section of the side cutting edge. Accordingly, as the drilling fluid exits the outlet cross-section of the side cutting edge, the fluid interacts with chips that are formed on the rake face adjacent to the outer and inner cutting edges 134 and 135. The chips become entrained in the drilling fluid flow and thus their normal transportation is possible.

Figure 19:
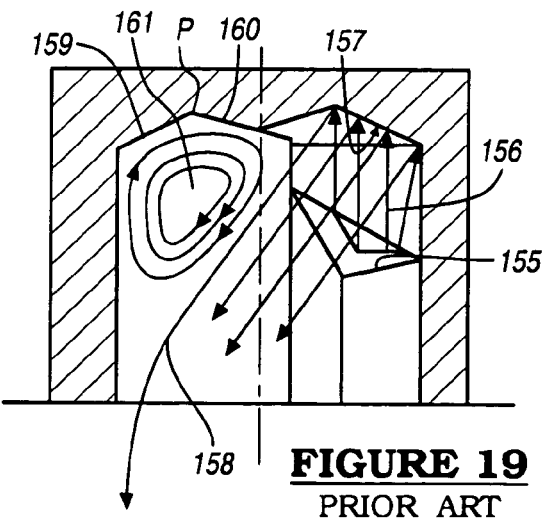
FIG. 19 illustrates the drilling fluid flow and the stagnation zone occurring in a typical step slash gundrill tip design.

When a gundrill having the stepped-slash design is employed, the fluid flow is schematically illustrated in FIG. 19. The drilling fluid, as referenced by arrows and numeral 156, is supplied in the bottom clearance space 141, and impacts a sculpture surface 157 of the hole being drilled, and is subsequently reflected by the sculpture surface 157 into the V-flute. A majority of the deflected drilling fluid 158 does not flow to the cutting edge because it is merely reflected and exited. As illustrated in FIG. 19, the fluid 156 'misses' the machining zone. Chips formed by outer cutting edge 159 and inner cutting edge 160 are not readily entrained in the fluid flow, and a 'dead' or stagnation zone 161 is formed.

Figure 20:
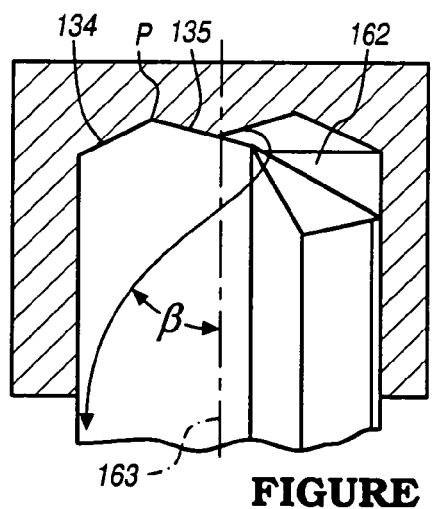
FIG. 20 illustrates the drilling fluid flow angle in a typical slash gundrill tip design.

Multiple studies indicate that chip collection may be regulated to an angle β with respect to a longitudinal axis 163 of the drill, which represents the drilling fluid flow direction as it enters the V-flute from a side passage 162 (FIG. 20). The chip collection effectiveness improves as β is increased. When the angle β is less than sixty degrees, a stagnation zone forms on the tool rake face and the chips may experience difficulties in joining the drilling fluid flow. A stagnation zone is created wherein angle β for the stepped design is approximately sixty-five degrees; and for the stepped-slash design, angle β is less than forty-five degrees. This relationship explains why chip plugs can form in the V-flute in the proximity of the cutting edges, although the overall flow rate is very high.

By carefully analyzing the results of conducted studies with the various tip designs, the effect and importance of outlet cross-sectional area is better understood. Table 1 below summarizes the comparison of the various prior art tip designs for an 8 mm diameter gundrill wherein the only parameter variance is the machining of the relief region of the tip defining the shape of the outlet passage. The various designs are ranked by the cross-sectional area of the outlet section in an effort to develop design parameters that are useful. A design parameter for various diameter drills and bit angles is dictated by varying materials to be drilled.

TABLE 1

Comparison of the cross-sectional area of the outlet passage of the side passages and drilling fluid pressure in the bottom clearance space for different known designs.

Gundrill parameters: diameter $D = 8$ mm (0.315"), $R_d = 5$ mm, $m_d = 2$ mm, $b = 0.5$ mm, $\phi_1 = 30°$, $\phi_2 = 20°$, $\alpha_{n2} = 12°$, $\psi_v = 120°$, $\phi_4 = 30°$. For slash design with a notch: $A_n = 2.5$ mm². For the stepped design: $S_t = 3$ mm, $\phi_4 = 0°$. For the stepped-slash design: $S_t = 3$ mm, $\phi_4 = 30°$. Drilling fluid flow rate is 5 Gpm (18.74 l/min).

| Design | Cross-sectional area of the outlet section of the side passage, $A_{ot}$, mm² | Axial cross-sectional area of the bottom space, $A_{BS}$, mm² | Bottom Space Ratio $A_{ot}/A_{BS}$ | Static Drilling fluid pressure in the bottom clearance space, Mpa |
|---|---|---|---|---|
| Slash | 6.32 | 5.64 | 112% | 0.15 |
| Slash with a notch | 8.82 | 5.64 | 156% | 0.10 |
| Stepped | 14.82 | 5.64 | 263% | 0.04 |
| Stepped-slash | 24.06 | 5.64 | 423% | 0.01 |

Another important parameter is the cross-sectional area of the outlet which is evaluated as a ratio of this area to the bottom space area. This parameter is referred to as bottom space ratio. Static drilling fluid pressure in the bottom space is compared for the various designs. Controlling the area of the outlet passage by careful tip design and the relief variant enables one having ordinary skill in the art to greatly improve chip removal and tip cooling. Traditionally, large outlet passage areas were believed to be variable in that they allowed for a greater drilling fluid flow. However, it has been determined that the absolute volume of drilling fluid flow is unimportant if the drilling fluid design does not adequately cool the active cutting surfaces of the tip or if stagnant pockets form in the region of the drill point.

The gundrill of the present design carefully controls the machining of the relief portion of the tip to maintain a relatively small outlet passage area, this results in a relatively high static drilling fluid pressure in the bottom clearance space. The increased pressure of the fluid in the bottom clearance space enables, through careful tip design, the fluid to be directed where it is needed most to cool the cutting edges, thus eliminating stagnation pockets. Sufficient flow is maintained to still effectively remove chips from the hole being drilled through the elongate fluid return path formed by the tip and shank flutes.

FIGS. 21–28 illustrate the tip geometry of cutting tip 200 of a preferred embodiment of the invention. It should be appreciated that the specific geometry of the cutting tip practicing the present invention may vary dramatically, as a function of drill diameter and the hardness of the material drilled and its chip formation properties. The gundrill cutting tip 200 is preferably formed of a carbide material that is brazed or welded to the drill shank. The cutting tip 200 is illustrated in side elevation in FIG. 21 viewing the cutting tip generally normal to primary rake surface 202. Primary rake surface 202 in conjunction with a secondary flank surface 204 form a generally V-shape tip flute 206 having an included angle of approximate 100 degrees to 130 degrees and preferably 120 degrees. The tip flute 206 is generally aligned with a corresponding shank flute in the associated elongate tubular shank to provide a passageway within the bore of the hole being drilled for chips and cutting fluid to be removed.

The cutting tip 200 is provided with an internal fluid passage 208 which terminates in an orifice 210. The plane of the primary rake surface 202 is recessed slightly relative to drill centerline 212 as illustrated in FIGS. 21 and 25. Secondary flank surface 204 is likewise slightly recessed relative to a radial plane extending through the drill centerline 212.

The primary rake surface 202 is provided with a radial outboard peripheral rake edge 214 which lies on a cylindrical surface coaxial with central axis 212. In the preferred embodiment illustrated, the peripheral rake edge 214 forms a line lying on the plane of the primary rake surface 202 and is parallel to centerline 212. The tip of the primary rake surface 202 terminates in a radial offset point 216 offset a distance $m_d$ from centerline 212. Point 216 is defined by outer cutting edge 218 and inner cutting edge 220. Outer cutting edge 218 forms an angle $\phi_1$, which in the illustrative embodiment is about twenty-five degrees. The inner cutting edge 220 forms an angle $\phi_2$ which is approximately seventeen degrees. As the cutting tip 200 is rotated and axially advanced into the workpiece, the outer cutting edge 218 and inner cutting edge 220, along with a portion of the peripheral rake edge 214 adjacent the outer cutting edge 218, axially cut the workpiece forming chips.

The angles $\phi_2$, and $\phi_2$, of cutting edges 218 and 220, as previously indicated are in a large part dependent upon the hardness and chip forming characteristics of the material being drilled. As illustrated in FIG. 11b, when the material is soft, the outer/inner cutting edge angles will increase. When the material is brittle as illustrated in FIG. 11c, the outer/inner cutting edge angles will be reduced significantly relative to a cutting tip design for typical materials shown in FIG. 11a. Once the tip profile and cutting edges are defined, the remaining surfaces formed on the cutting tip end are then designed to be recessed sufficiently to provide clearance as the gundrill is rotated and axially advanced and to direct the flow of drilling fluid.

Figure 28:
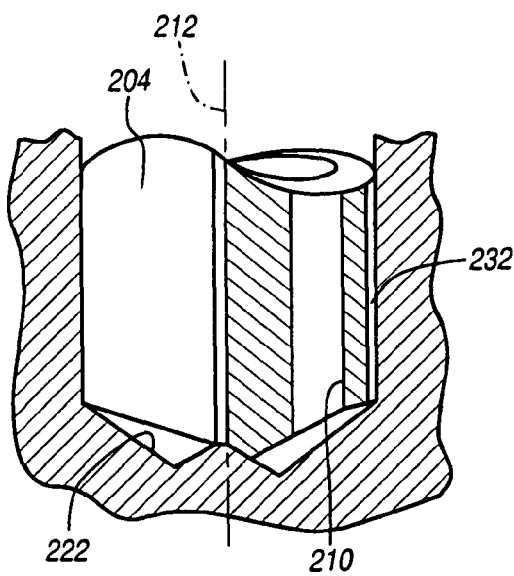
FIG. 28 is a cross-sectional view of a gundrill and associated hole taken along section line U—U of FIG. 26.

In the embodiment illustrated, cutting tip 200 has its end defined by four generally flat machined surfaces or facets. In use, gundrills are frequently sharpened requiring the facets forming the tip to be periodically re-ground. It is, therefore, desirable to have a relatively few number of facets which are easily machined on a tool sharpening station. While the preferred embodiment illustrated utilizes four facets, a five or six facet design can alternatively be used. Similarly, while the present design utilizes four planar facets, it is possible to substitute a frusto conical or helical facet as shown in the prior art gundrills in FIGS. 17 and 19. The purpose of the machined facets on the end of the cutting tip is to properly define the point 216 and outer 218 and inner 220 cutting edges, while providing adequate clearance, maintaining structural support for the cutting edges, and controlling the area of an outlet passage 222. The outlet passage 222 is illustrated in FIG. 28 which connects the bottom clearance space with the internal fluid passageway formed between the tip flute 206 and the circumferentially bored holed through which cutting fluid and chips, as they are formed, exit.

In the embodiment illustrated, the four facets machined on the end of the cutting tip are outer relief surface 224, inner relief surface 226, auxiliary relief surface 228, and dub-off relief surface 230. The primary relief angle $\alpha_{n3}$ in the embodiment illustrated is approximately twenty degrees as illustrated in FIG. 22 which is a section taken along section line S—S in FIG. 21. In the embodiment illustrated, inner relief surface 226 forms a twelve degree relief angle $\alpha_{n2}$ as shown in FIG. 24 when viewed in the direction of arrow T in FIG. 21. The auxiliary relief surface 228 forms an angle $\alpha_{n1-2}$ of approximately twenty-five degrees as shown in FIG. 23 when viewed in cross-section R—R in FIG. 21. The dub-off relief surface 230 forms an angle $\phi_4$ approximately equal to the approach angle $\phi_1$ of the outer cutting edge as illustrated in FIG. 24 when viewed the direction of arrow T in FIG. 21. The dub-off relief surface 230 is particularly important. This machined surface is primarily responsible for determining the physical size of the outlet passage 222 formed between the cutting tip 200 and the hole being drilled. The outlet passage area is calculated utilizing a solid modeling computer design program, which not only considers the tip geometry, but the axial feed rate of the gundrill. Considering feed rates is particularly important when soft materials are being cut and the axial feed rate is very high.

Figure 27:
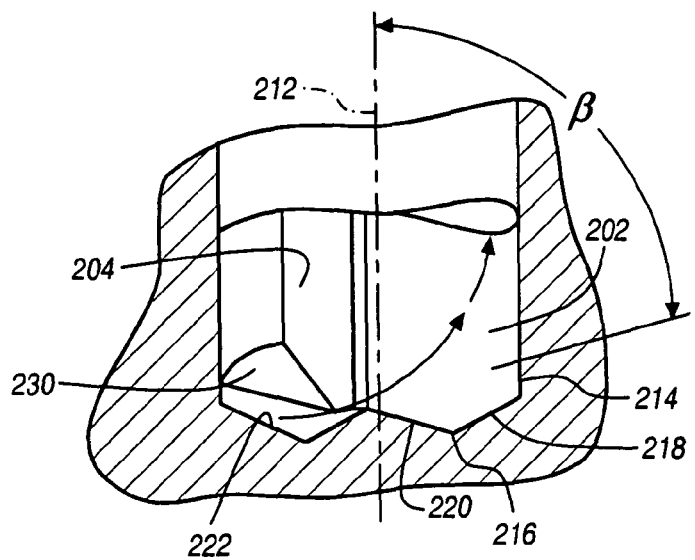
FIG. 27 is a cross-sectional view illustrating the gundrill of FIG. 26 and the associated hole being drilled.
Figure 26:
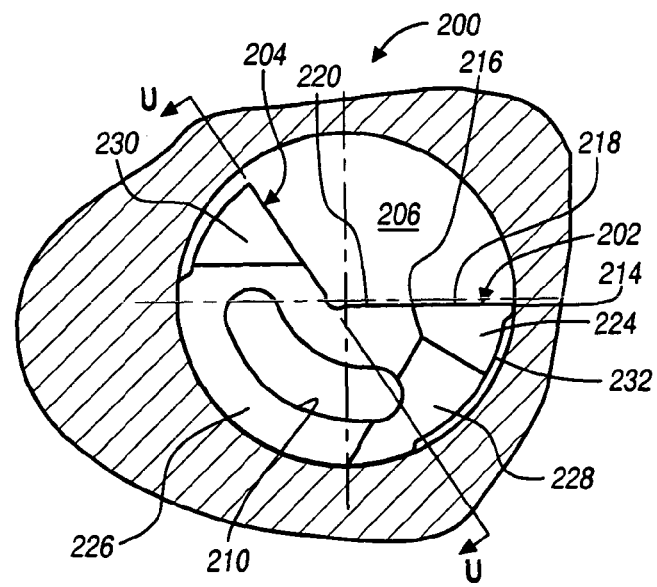
FIG. 26 is an axial end view of the gundrill in FIG. 21 cooperating within a hole being drilled.

The amount of relief provided by the inner relief surface 226 and auxiliary relief surface 228 dictates the volume of the bottom clearance space between the end of the cutting tip 200 and the sculpture surface of the hole bottom. The bottom clearance space must be sufficiently large so as to not obstruct the flow of the drilling fluid through orifice 210. To further enhance drilling fluid flow through orifice 210, a sharp corner of the orifice formed at the intersection of the internal fluid passageway 208 and the inner relief surface 226 is radiused slightly, initially and after each tip sharpening operation. By controlling the area of outlet passage 222, the bottom clearance space will be maintained at a substantial pressure which enables the drilling fluid flow exiting the bottom clearance space to be controlled by tip geometry. The largest flow path for fluid exiting the bottom clearance space is outlet passage 222. By controlling the outlet passage 222 size, the angle of the jet of fluid exiting the outlet passage 222, $\beta$ may be maximized. Angle $\beta$ is the largest angle formed by the cutting fluid as it exits the outlet passage 222, and before it begins upward to exit the hole. Angle $\beta$ is illustrated in FIG. 27. Angle $\alpha$ is best measured experimentally by machining a clear plastic block and visually observing the angle from the bottom as it exits orifice 222. Ideally, $\beta$ will be as large as possible while still maintaining adequate drilling fluid flow sufficient to remove chips from the hole being formed. In order to prevent stagnation, angle $\beta$ should be greater than sixty-six degrees. Ideally angle $\beta$ will be greater than seventy-five degrees and most preferably, angle $\beta$ will be greater than eighty degrees in order to direct drilling fluid into the cutting region and to prevent stagnation.

Since the geometry of the cutting tip 200 of the present invention varies significantly as a function of hole diameter and material, the outlet passage 222 area can be best expressed as a function of the longitudinal cross-sectional area of the bottom space taken along the central axis 212. The bottom space cross-sections for various material hardnesses are illustrated in FIG. 11a, 11b and 11c. It should be appreciated that frequently the hole diameter and the longitudinal cross-section of the bottom space can vary dramatically. Brittle materials require a relatively flat drill tip resulting in a small longitudinal cross-section of the bottom space, while soft materials as illustrated in FIG. 11b have a much larger bottom space cross-section. The outlet passage 222 area will increase or decrease accordingly as a function of the bottom space longitudinal cross-section. The outlet passage 222 area should be always maintained less than the longitudinal cross-section of the bottom space. Preferably, the outlet passage is less than seventy-five percent of the bottom space cross-section, and most preferably, less than half of the bottom space cross-sectional area. By carefully controlling the tip geometry and the axial feed range, the outlet passage 222 area is less than twenty-five percent of the longitudinal cross-sectional area of the bottom space when practicing the present invention in applications where tip cooling is a problem.

By controlling the outlet passage 222 area, not only can the orientation of the fluid flow exiting the outlet passage 222, be controlled to maximize β, but the resulting increase in the static drilling fluid pressure in the bottom clearance space can further provide the ability to direct fluid about the cutting tip 200 circumferential periphery as the hole is formed. As a result of maintaining relatively high fluid pressure in the bottom clearance space, it becomes possible to direct drilling fluid from the bottom clearance space to areas of the cutting tip 200, which experience wear or cooling problems. Such a region is the peripheral rake edge 214 which frequently experiences wear near the corner formed by the outer cutting edge 218 and peripheral rake edge 214. To cool this region, the gundrill cutting tip 200 of the present invention is provided with a localized relief passage 232 which extends between the cutting tip and the hole being formed in the area immediately circumferentially behind the advancing peripheral rake edge 214. Relief passage 232 is formed by machining away material from the cutting tip 200 while forming a localized flat, or alternatively, a concave depression running axially along the cutting tip immediately behind peripheral rake edge 214. The machined relief passage 232 preferably extends the length of the cutting tip providing an alternative exit path for cooling within the bottom clearance space.

After the localized relief passage 232 extends the length of the cutting tip 200, it is connected to the internal fluid passage formed in the flute, by crossover port 236 illustrated in FIGS. 29, 32, 34 and 36. Crossover port 236 can alternatively be machined in the cutting tip 200, in the end of the shank, or partially in both the cutting tip 200 and the shank. The crossover port 236 is oriented relative to the elongate fluid return path to introduce a jet of drilling fluid at an angle which assists the drilling fluid and the entrained chips to exit the hole being drilled.

Ideally, the outlet passage 222 is sized to be sufficiently small in relation to the relief passage 232 so that over ten percent of the drilling fluid that is delivered to the orifice 210 exits the end clearance volume through the relief passage 232. Preferably, more than fifteen percent of the drilling fluid exits the end clearance volume through the relief passage 232. In gundrills which have historically experienced cooling and wear problems in the region of the peripheral rake edge 214, the outlet passage 222 can be sized sufficiently small so that over twenty percent of the drilling fluid exits the end clearance volume through the relief passage 232.

Figure 29:
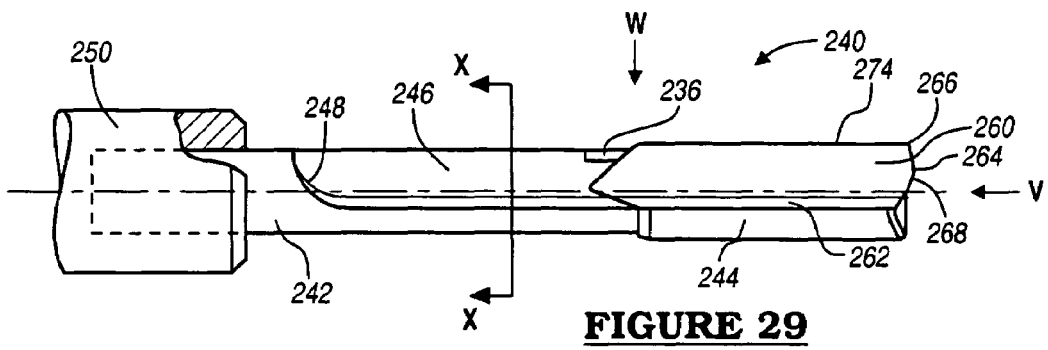
FIG. 29 is a side elevational view of a gundrill of the present invention.

FIG. 29 illustrates a gundrill 240 made in accordance with present invention. The gundrill 240 consists of a shank portion 242 and a tip portion 244. The shank portion 242 is preferably formed of hard material, such as hardened steel. The shank portion 242 may be formed from a thick wall tubular member which has a diameter slightly undersized relative to that of the cutting tip portion 244, to assure maximum torsional and bending rigidity which is particularly important when drilling deep holes. Shank portion 242, is formed from tube stock, by swedging or deforming the tube to form a generally longitudinally extending V-shape flute 246. Flute 246 serves to form a chip removal passage in cooperation with the internal surface of the hole being drilled. Normally, flute 246 extends for a substantial portion of the shank length and terminates at an incline ramp 248 which is generally adjacent driver 250 to which the fixed end of the shank 242 is attached.

Driver 250 is adapted to connect to the spindle chuck on the drilling machine and will have a complimentary profile suitable for attachment with the chuck to be used. The driver 250 is further provided with a drilling fluid inlet port which can be coupled to a source of high pressure drilling fluid in the drilling station. Drilling fluid flows through the internal passage in the driver 250 through an internal fluid passage 252 which extends through shank 242 and through the internal fluid passage 254 extending through the tip 244 which terminates at orifice 256.

Cutting tip 244 is generally bounded by an imaginary cylinder corresponding to the size of the hole being drilled which is slightly larger in diameter than the maximum diameter of shank portion 242. Shank flute 246 is generally V-shaped and extends the full length of cutting tip 244. The cutting tip 244 is secured to the end of the shank 242 by a braze or weld in a conventional manner so that tip flute 258 is generally aligned with the shank flute 246. In the embodiment illustrated, tip flute 258 and shank flute 246 are shown as straight. While this construction is preferred, it should be understood that if desired, the flutes which form an elongate fluid return path can extend helically about the cutting tip 244 and shank 242. The cutting tip flute 258 is generally bounded by primary rake surface 260 and secondary flank surface 262. As previously described in the preferred embodiment, the free end of the cutting tip forms a cutting point 264 formed by outer cutting edge 266 and inner cutting edge 268. This simple design facilitates easy re-sharpening as the machined facets, which form the cutting surfaces on the end of the cutting tip become worn and used. It should be understood, of course, that if desired, the designer can form a primary rake surface 260 with a series of axially extending flats or an axially extending concave curve while still practicing the present invention. However, planar primary rake and secondary flank surfaces are preferred for simplicity, ease of manufacture and ease of re-sharpening.

Gundrill 240 has its outer generally cylindrical wall portion shaped to provide a pair of raised narrow axial elongate wear pads 270 and 272, which are spaced about the periphery of the cutting tip 244 and extend longitudinally. Wear pads 270 and 272 are raised slightly relative to the adjacent cylindrical surface of the cutting tip 244 in order to limit the contact of the hole being drilled since the cylindrical portion of the cutting tip 244 to the two wear pads 270, 272 and peripheral rake edge 274 all lie on this cylindrical surface. Since cutting point 264 is offset from the drill centerline, the reaction force caused by the cutting of the material to be removed causes the cutting tip 244 to be urged radially, the reaction force caused by forming the hole being drilled is transmitted by wear pads 270 and 272. Of course, it is possible to have fewer or more than two wear pads; however, the simple dual wear pad design is commonly used and is preferred.

Figure 30:
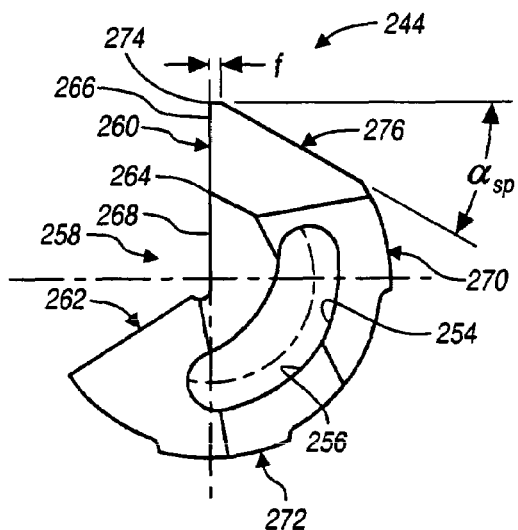
FIG. 30 is an enlarged axial end view of the gundrill tip taken in the direction of arrow V.

The remainder of the cylindrical portion of the cutting tip 244 is recessed slightly relative to the two wear pads and the peripheral rake edge 274, for providing an axial flow path for drilling fluid to cool and lubricate the cutting tip 244 as the hole is formed. In the preferred embodiment of the cutting tip 244 illustrated, a large localized relief passage for drilling fluid is formed in the region immediately behind the peripheral rake edge 274 as the drill is rotated in the cutting direction. This localized relief passage is formed by machining material from the cutting tip 244 in order to depart from the cylindrical hole being formed in the region intermediate the peripheral rake edge 274 and the first wear pad 270. FIG. 30 illustrates a planar relief surface 276, which is machined into the outer generally cylindrical surface of the cutting tip behind the peripheral rake edge 274. The planar relief surface 276, in conjunction with the cylindrical hole being drilled, defines a generally crescent shape localized relief passage 278 as illustrated in FIG. 35.

Figure 31:
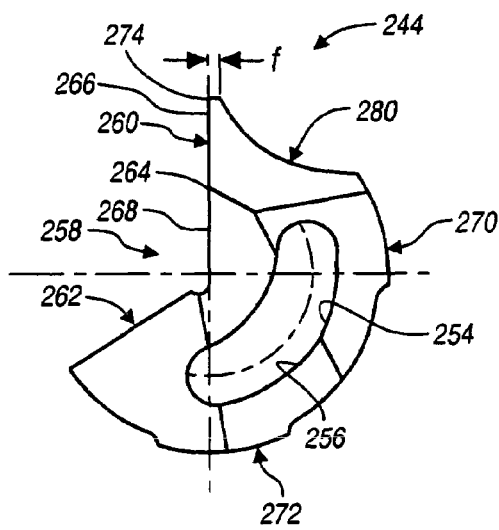
FIG. 31 is an alternative embodiment of the gundrill tip shown in FIG. 30.
Figure 33:
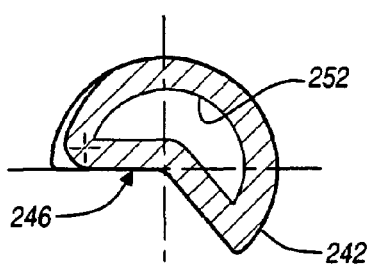
FIG. 33 is a cross-sectional view taken along section line X—X of FIG. 29.
Figure 32:
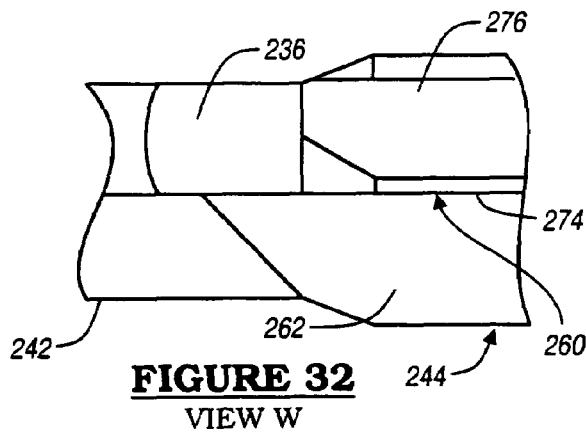
FIG. 32 is an enlarged view of the crossover port taken in the direction of arrow W in FIG. 29.

An alternative relief passage configuration is illustrated in FIG. 31. Rather than the planar relief surface 276 as shown in FIG. 30, the alternative embodiment is provided with a concave relief surface 280 which enables a slightly larger cross-section relief passage to be formed in a given circumferential area of the cutting tip 244. The size of the planar or concave relief passage 278 should be sufficiently large to enable adequate drilling fluid to flow therethrough to cool the peripheral rake edge 274 as well as the outer cutting edge 266. The size of the relief passage 278 will be in part, dependent upon the size of the outlet passage 222, which is the region bounded by the distal end of the secondary flank surface 228 and the sculpture surface of the hole being drilled (FIG. 28). It is desirable that a balance of flow exists between the relief passage 278 and the outlet passage 222 so that the flow of fluid out of the bottom clearance space is carefully controlled.

It is preferred that at least ten percent of the drilling fluid introduced into the end clearance volume is discharged through the relief passage 278; and, more preferably, it is desired that at least fifteen percent of the drilling fluid, which enters the end clearance volume, exits through the relief passage 278. In some applications wherein wear has been experienced at the peripheral rake edge 274 or at the intersection of the peripheral rake edge 274 and the primary rake surface 260, the relative area of the relief passage 278 can be increased so that over twenty percent of the drilling fluid that enters the end clearance volume exits through the relief passage 278.

As previously noted, the remaining cylindrical portion of the cutting tip 244 is either a wear pad 270 or 272, which abuts the hole being drilled, or a region slightly recessed from the hole being drilled to provide a slight clearance. Some very small amount of flow will exit the end clearance space through this recessed region although drilling fluid flow is primarily through the outlet passage 222 and the relief passage 276.

The flow of drilling fluid through relief passage 278 ultimately will rejoin the drilling fluid flowing through the internal fluid passageway defined between the shank flute 246 and the wall of the hole being drilled. Relief passage 278 will preferably connect to the shank flute 246 by way of the crossover port 236 illustrated in FIGS. 32, 34 and 36. The crossover port 236 is configured to introduce a jet of drilling fluid into the tubular shank passageway at an angle which assists the drilling fluid in the entrained chips to exit the hole being drilled. The flow of drilling fluid through the crossover port 236 is illustrated by the directional flow arrows in FIGS. 34–36. FIG. 35 illustrates an alternative orifice 284 having a circular cross-section as opposed to the kidney-shaped cross-section shown previously. In the case of a circular cross-section orifice located within the center of the inner relief face 226 illustrated, the addition of the localized relief passage 278 causes drilling fluid to flow immediately behind the primary cutting and secondary cutting edges 266 and 268, which form the drill cutting point 264. The addition of localized relief passageway 278 significantly reduces the temperature of these cutting surfaces and dramatically increases tool life. The flow of drilling fluid through the localized relief passage 278 also serves to minimize material buildup on the peripheral rake edge 274, which improves the surface quality of the hole being drilled and helps to minimize the likelihood of chip accumulation in the internal fluid passage 252.

The flow of drilling fluid through the localized relief passage 278 can be experimentally observed by drilling a clear plastic block in the manner that flow rates through outlet passage 222 were observed to experimentally measure angle β. In order to observe the drilling fluid flow, a strobe light was utilized and the flash frequency adjusted so that the drill appeared to rotationally stand still. The flow of drilling fluid through outlet passage 222, through localized relief passage 278, and through crossover port 236 could be visually monitored. While orienting the crossover port 236 in a manner to introduce the flow of drilling fluid through the relief passage 278 into the fluid at an angle, the relief passage 278 flow aided in removing chips from the cutting tip 244 and further prevented chip clogging in the shank flute 246.

While the preceding description focuses primarily on the structure of the gundrill cutting tip it should be appreciated that the present invention further encompasses the method of using of a gundrill having tip geometry which, when rotated and axially advanced relative to the workpiece forms an outlet orifice area measured between the end of the secondary flank and the hole being drilled which is a controlled size relative to the cross-sectional area of the bottom clearance space. The method further controls drilling fluid pressure in the bottom clearance space so that the drilling fluid exits the orifice forming an angle β which is sufficiently large to prevent drilling fluid stagnation. The gundrill tip may be further cooled in a novel manner by forming a relief passageway behind the peripheral rake edge which is sized relative to the orifice to allow a significant amount of the drilling fluid entering in the clearance space to exit through the relief passageway. It should be appreciated that the geometry of the cutting tip utilized in the present invention may vary greatly based on hole diameter, material hardness and material chip forming characteristics. Similarly various facet designs can be used to practice the invention. The present invention is not intended to be limited by the preferred embodiments illustrated, as the numerous changes may be made to the tip geometry while still practicing the invention set forth in the following claims.

What is claimed:

1. A gundrill for forming deep holes in a body of material as the gundrill is relatively rotated, axially advanced and supplied with drilling fluid, the gundrill comprising:

an elongate tubular shank having a driven end, a distal end and a central region extending therebetween along a central axis, the tubular shank having a cross-section defining a shank flute extending from the distal end for at least a substantial portion of the length of the central region, providing a portion of an elongate fluid return path between the hole being drilled and the shank flute, allowing drilling fluid, which is pumped into an internal fluid passage formed through the tubular shank to exit the hole being drilled removing chips as they are formed; and a cutting tip affixed to the distal end of the tubular shank, the cutting tip having an internal fluid passageway which is coupled to the tubular shank internal passageway and terminates in an orifice formed in a tip end surface, a tip flute extending axially from the tip end surface toward and generally aligned with the shank flute providing a portion of the elongate fluid return path, the tip flute defined by a secondary flank surface and a generally radially extending primary rake surface having a peripheral rake edge lying on a cylindrical surface coaxial with the central axis, and a generally radially extending cutting edge at the tip end which defines a radially offset point;

wherein the surface of the cutting tip circumferentially behind the peripheral rake edge as the gundrill rotates deviates inwardly sufficiently from the cylindrical hole to form an enlarged localized relief passage which provides an alternative exit path for drilling fluid, the relief passage extending from the tip end toward the tubular shank member;

wherein the tip end surface of the cutting tip cooperates with the hole being drilled to define a toroidal bottom space area having a portion thereof which lies between the end of the tip and hole bottom forming a pressurized end clearance volume which receives drilling fluid through the tip orifice and discharges drilling fluid through the relief passage and an outlet passage, which is generally bounded by the distal edge of the secondary flank surface and the bottom of the hole being drilled;

wherein at least one of the tubular shank and the cutting tip is provided with a crossover port connecting the relief passage to the elongate fluid return path; and wherein the crossover port is primarily formed in the tubular shank.

2. The gundrill of claim 1 wherein the drilling fluid exiting the outlet passage into the elongate fluid return path initially forms an angle β, relative to the axis of the hole being drilled when viewed radially, which is sufficiently large to effectively cool the tip cutting edge without stagnation.

3. The gundrill of claim 2 wherein the angle β is greater than sixty-six degrees.

4. The gundrill of claim 2 wherein the angle β is greater than seventy-five degrees.

5. The gundrill of claim 2 wherein the area of the outlet passage is sufficiently small so that drilling fluid exit angle β is greater than eighty degrees.

6. The gundrill of claim 1 wherein the cross-sectional area of the outlet passage is less than a longitudinal cross sectional area of the bottom space taken along the hole axis.

7. The gundrill of claim 1 wherein the cross-sectional area of the outlet passage is less than seventy-five percent of a longitudinal cross sectional area of the bottom space taken along the hole axis.

8. The gundrill of claim 1 wherein the cross-sectional area of the outlet passage is less than fifty percent of a longitudinal cross sectional area of the bottom space taken along the hole axis.

9. The gundrill of claim 1 wherein the cross-sectional area of the outlet passage is less than twenty-five percent of a longitudinal cross sectional area of the bottom space taken along the hole axis.

10. The gundrill of claim 1 wherein the crossover port is configured to introduce a jet of drilling fluid into the elongate fluid return path at an angle which assists the drilling fluid and entrained chips to exit the hole being drilled.

11. The gundrill of claim 1 wherein the area of the outlet passage is sufficiently small in relation to the area of the relief passage so that over fifteen percent of the drilling fluid exits the end clearance volume through the relief passage.

12. The gundrill of claim 1 wherein the area of the outlet passage is sufficiently small in relation to the area of the relief passage so that over twenty percent of the drilling fluid exits the end clearance volume through the relief passage.

13. The gundrill of claim 1 wherein the enlarged localized relief passage is non-cylindrical for facilitating the flow of drilling fluid.

14. A gundrill for forming deep holes in a body of material as the gundrill is relatively rotated, axially advanced and supplied with drilling fluid, the gundrill comprising:

an elongate tubular shank having a driven end, a distal end and a central region extending therebetween along a central axis, the tubular shank having a cross-section defining a shank flute extending from the distal end for at least a substantial portion of the length of the central region, providing a portion of an elongate fluid return path between the hole being drilled and the shank flute, allowing drilling fluid, which is pumped into an internal fluid passage formed through the tubular shank to exit the hole being drilled removing chips as they are formed; and a cutting tip affixed to the distal end of the tubular shank, the cutting tip having an internal fluid passageway which is coupled to the tubular shank internal passageway and terminates in an orifice formed in a tip end surface, a tip flute extending axially from the tip end surface toward and generally aligned with the shank flute providing a portion of the elongate fluid return path, the tip flute defined by a secondary flank surface and a generally radially extending primary rake surface having a peripheral rake edge lying on a cylindrical surface coaxial with the central axis, and a generally radially extending cutting edge at the tip end which defines a radially offset point;

wherein the surface of the cutting tip circumferentially behind the peripheral rake edge as the gundrill rotates deviates inwardly sufficiently from the cylindrical hole to form an enlarged localized relief passage which provides an alternative exit path for drilling fluid, the relief passage extending from the tip end toward the tubular shank member;

wherein the tip end surface of the cutting tip cooperates with the hole being drilled to define a toroidal bottom space area having a portion thereof which lies between the end of the tip and hole bottom forming a pressurized end clearance volume which receives drilling fluid through the tip orifice and discharges drilling fluid through the relief passage and an outlet passage, which is generally bounded by the distal edge of the secondary flank surface and the bottom of the hole being drilled; and wherein the area of the outlet passage is sufficiently small in relation to the area of the relief passage so that over ten percent of the drilling fluid exits the end clearance volume through the relief passage.

15. A gundrill for forming deep holes in a body of material as the gundrill is rotated, axially advanced and supplied with drilling fluid, the gundrill comprising:

an elongate tubular shank having a driven end, a distal end and a central region extending therebetween along a central axis, the tubular shank having a cross-section defining a shank flute extending from the distal end for at least a substantial portion of the length of the central region providing a portion of an elongate fluid return path between the hole being drilled and the shank flute allowing drilling fluid, which is pumped into an internal fluid passage formed through the tubular shank to exit the hole being drilled removing chips as they are formed; and a cutting tip affixed to the distal end of the tubular shank, the cutting tip having an internal fluid passageway which is coupled to the tubular shank internal passage and terminates in an orifice formed in a tip end surface, and a tip flute extending axially from the tip end surface toward and generally aligned with the shank flute providing a portion of the elongate fluid return path, the tip flute defined by a secondary flank surface and a generally radial extending primary rake surface having a peripheral rake edge lying on a cylindrical surface coaxial with the central axis, and a generally radially extending cutting edge at the tip end which defines a radially offset point;

wherein the surface of the cutting tip circumferentially behind the peripheral rake edge as the gundrill rotates deviates inwardly sufficiently from the cylindrical hole to form an enlarged localized relief passage which provides an alternative exit path for drilling fluid extending from the tip end toward the tubular shank member;

wherein the tip end surface of the cutting tip cooperates with the hole being drilled to define a toroidal bottom space area having a portion thereof which lies between the end of the tip and hole bottom forming a pressurized end clearance volume which receives drilling fluid through the tip orifice and discharges drilling fluid through the relief passage and an outlet passage, which is generally bounded by the distal edge of the secondary flank surface and the bottom of the hole being drilled; and wherein the cross-sectional area of the outlet passage is less than fifty percent of a longitudinal cross-sectional area of the bottom space taken along the hole axis, so that the drilling fluid exiting the outlet passage into the elongate fluid return path initially forms a maximum angle $\beta$, relative to the hole being drilled when viewed radially, which is sufficiently large to effectively cool the tip cutting edge without stagnation.

16. The gundrill of claim 15 wherein the angle $\beta$ is greater than sixty-six degrees.

17. The gundrill of claim 15 wherein the angle $\beta$ is greater than seventy-five degrees.

18. The gundrill of claim 15 wherein the area of the outlet passage is sufficiently small in relation to the area of the relief passage so that over ten percent of the drilling fluid exits the end clearance volume through the relief passage.

19. The gundrill of claim 15 wherein the area of the outlet passage is sufficiently small in relation to the area of the relief passage so that over fifteen percent of the drilling fluid exits the end clearance volume through the relief passage.

* * * * *